No. 879,541. PATENTED FEB. 18, 1908.
R. O. HAMMOND.
SHOE POLISHING MACHINE.
APPLICATION FILED FEB. 3, 1904. RENEWED NOV. 18, 1907.

6 SHEETS—SHEET 1.

Witnesses.
B. Mason
M. Sewert

Robert O. Hammond, Inventor.
By Reinhart & Burkhart, Attorney

No. 879,541.           PATENTED FEB. 18, 1908.
R. O. HAMMOND.
SHOE POLISHING MACHINE.
APPLICATION FILED FEB. 8, 1904. RENEWED NOV. 18, 1907.
8 SHEETS—SHEET 2.
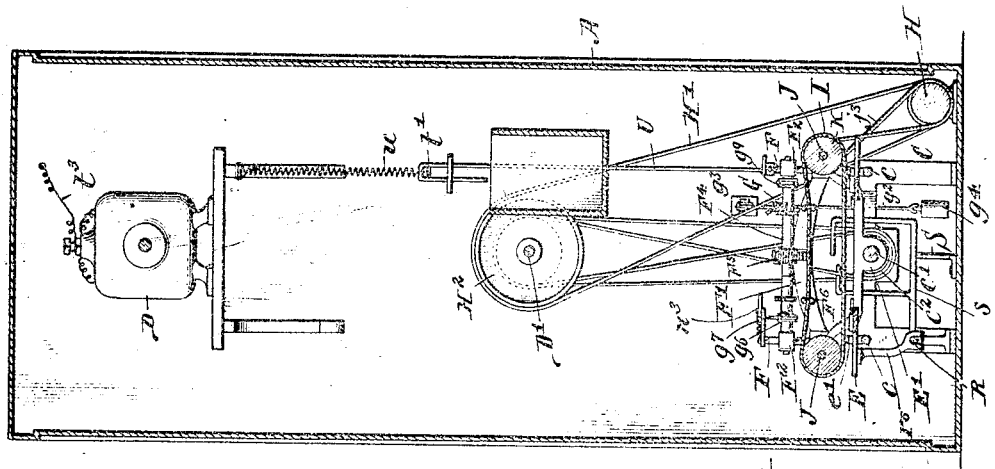
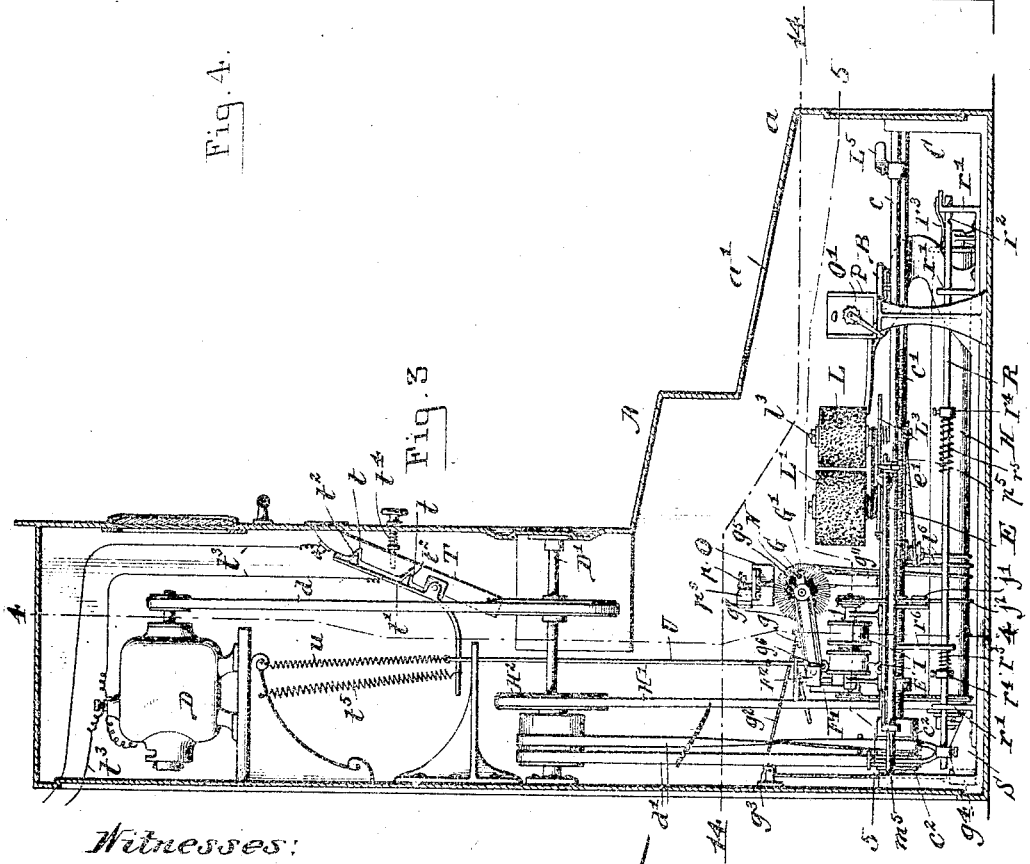
Witnesses:
R. Wason
W. Sewert
Robert O. Hammond, Inventor,
By Neubert & Burkhart
Attorneys.

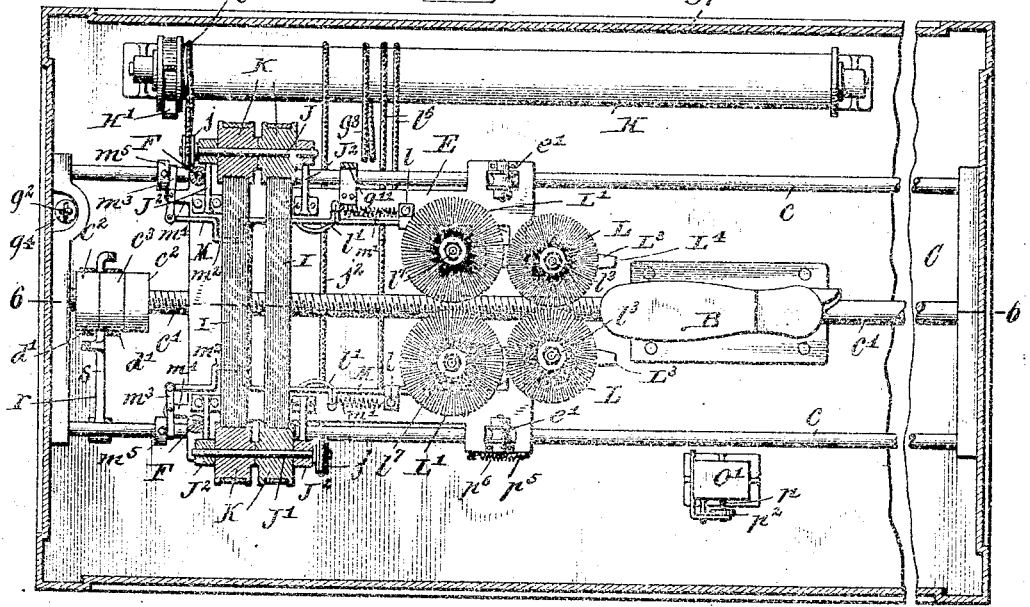

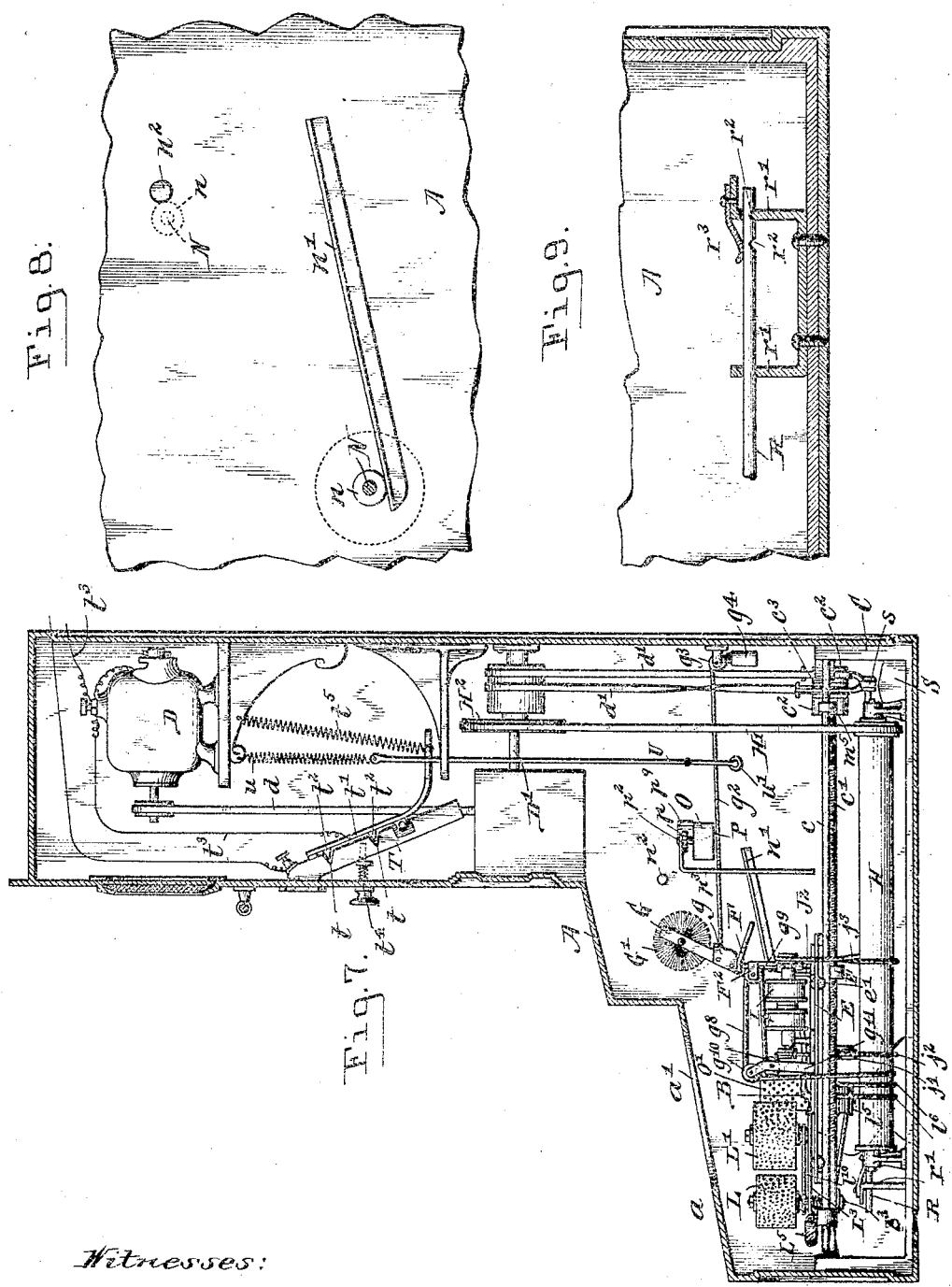

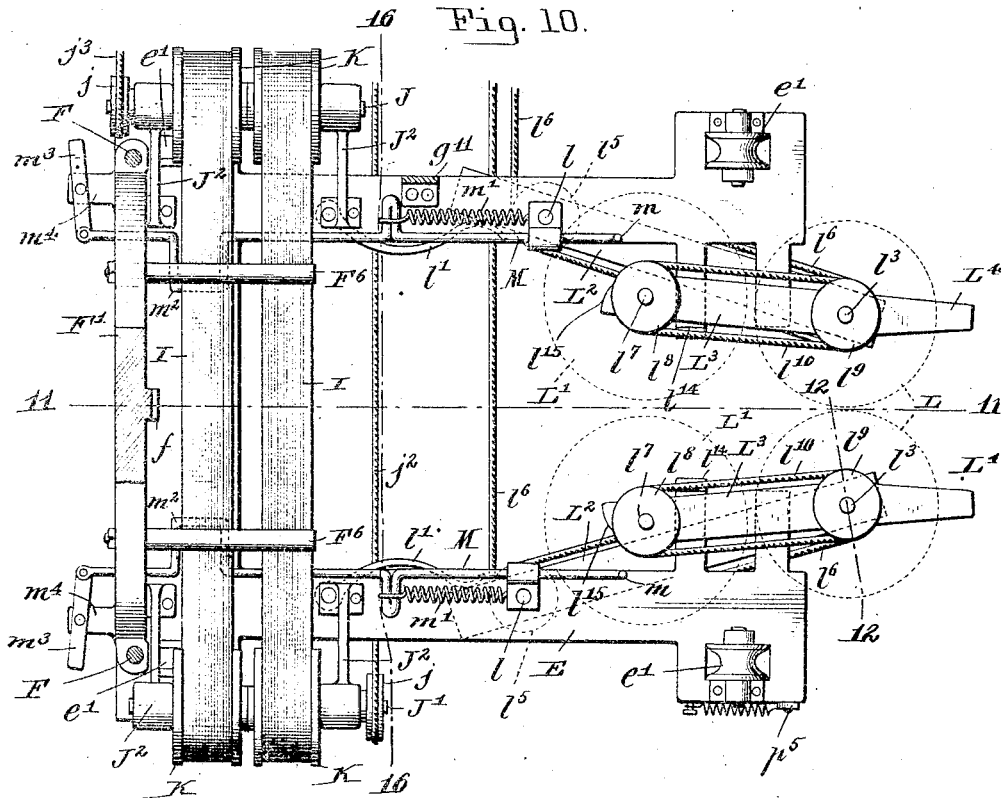

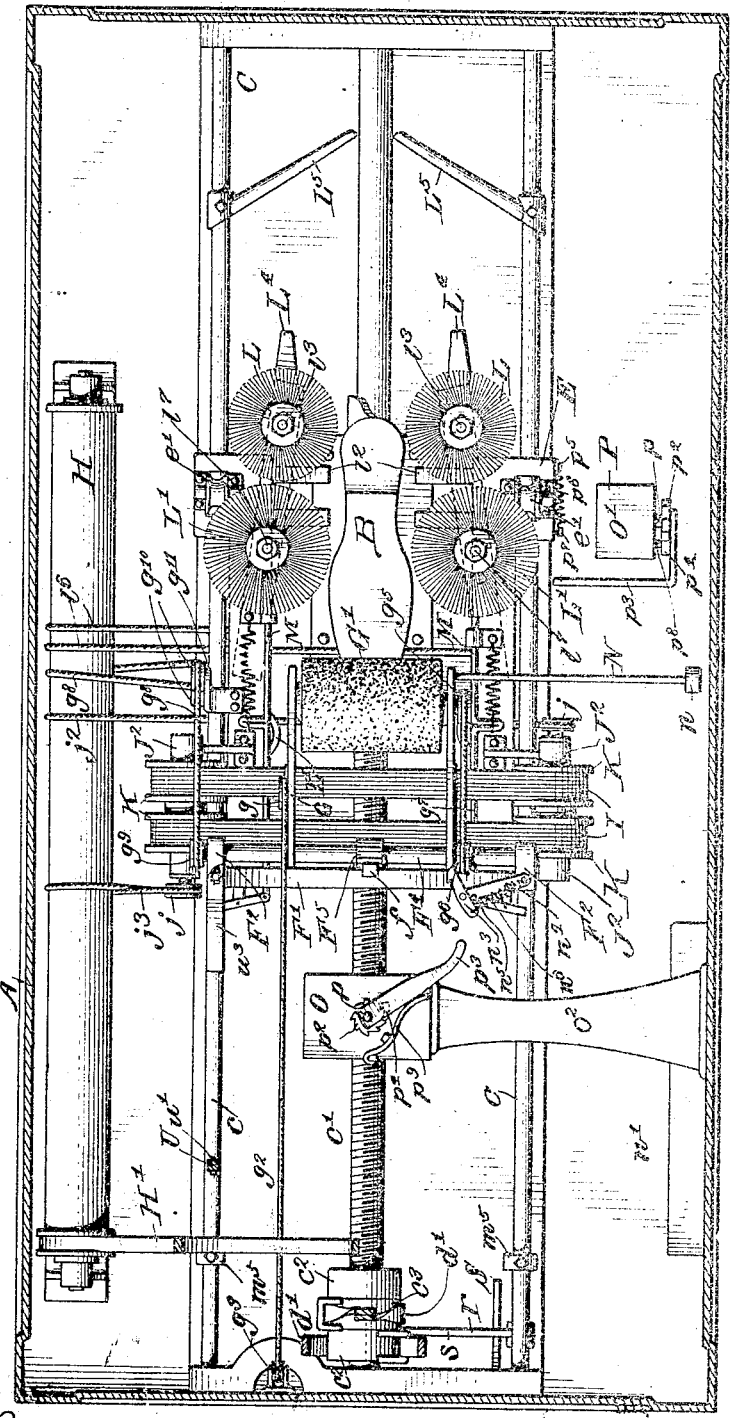

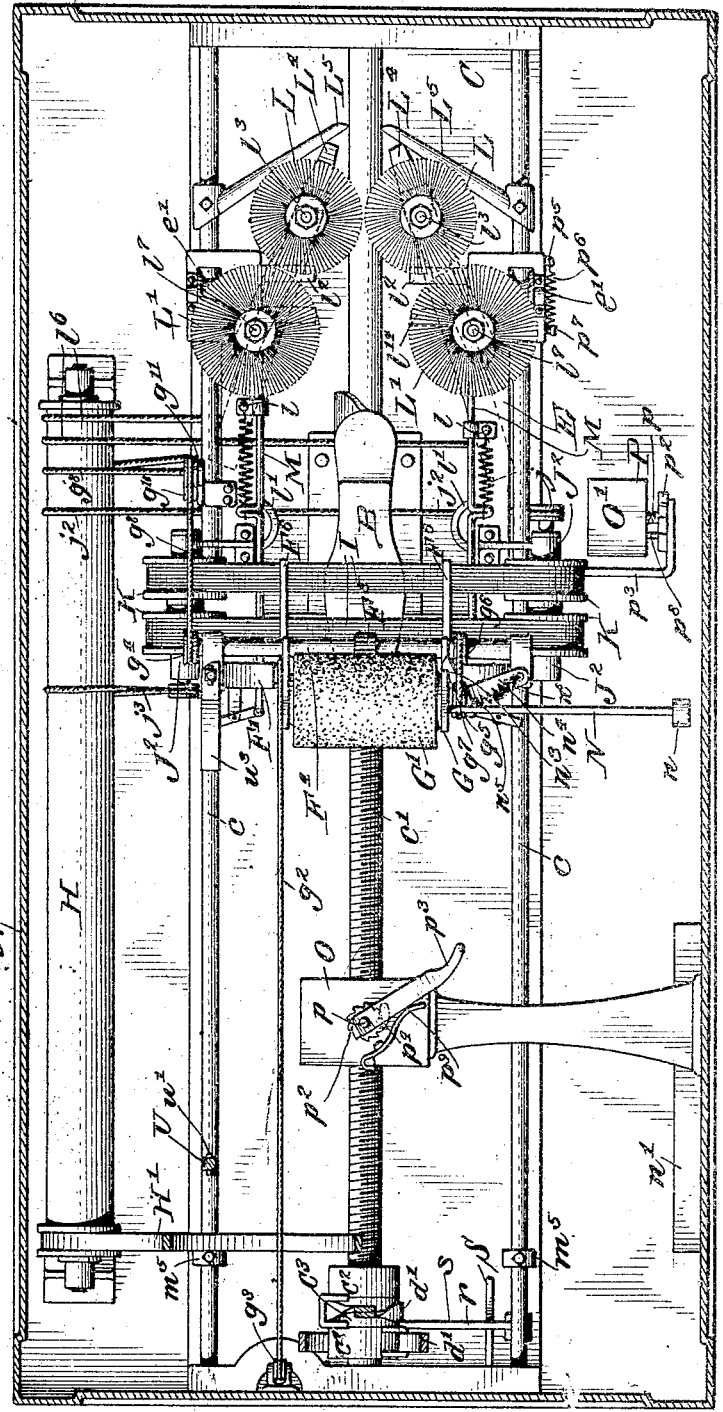

No. 879,541. PATENTED FEB. 18, 1908.
R. O. HAMMOND.
SHOE POLISHING MACHINE.
APPLICATION FILED FEB. 8, 1904. RENEWED NOV. 18, 1907.
8 SHEETS—SHEET 8.
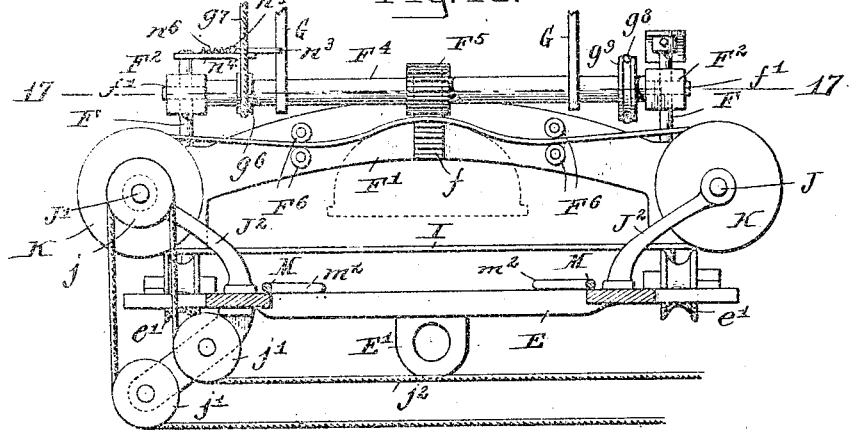
Witnesses:
Robert O. Hammond, Inventor.
By Neuhart & Burkhart
Attorneys.

UNITED STATES PATENT OFFICE.

ROBERT O. HAMMOND, OF BUFFALO, NEW YORK, ASSIGNOR, BY MESNE ASSIGNMENTS, TO UNION SHOE POLISHING MACHINE COMPANY, OF ELMIRA, NEW YORK, A CORPORATION OF NEW YORK.

SHOE-POLISHING MACHINE.

No. 879,541.     Specification of Letters Patent.     Patented Feb. 18, 1908.

Application filed February 8, 1904. Serial No. 192,686. Renewed November 18, 1907. Serial No. 402,743.

*To all whom it may concern:*

Be it known that I, ROBERT O. HAMMOND, a citizen of the United States, residing at Buffalo, in the county of Erie and State of New York, have invented certain new and useful Improvements in Shoe-Polishing Machines, of which the following is a specification.

My invention relates to machines for polishing shoes.

The object of this invention is the production of a machine which will effectively dust, blacken and polish shoes and which can be easily controlled by the person having his shoes polished.

The invention consists in the novel construction, arrangement, and combination of parts to be hereinafter described and more particularly pointed out in the subjoined claims.

Figure 2:
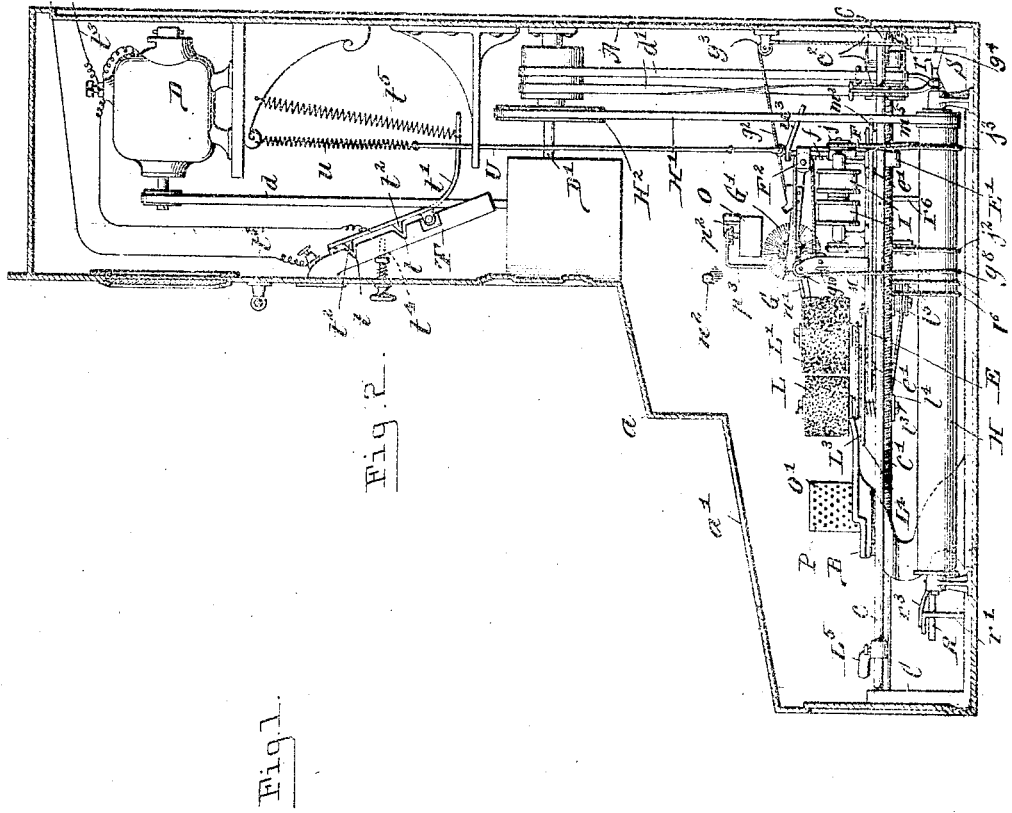
Figure 1:
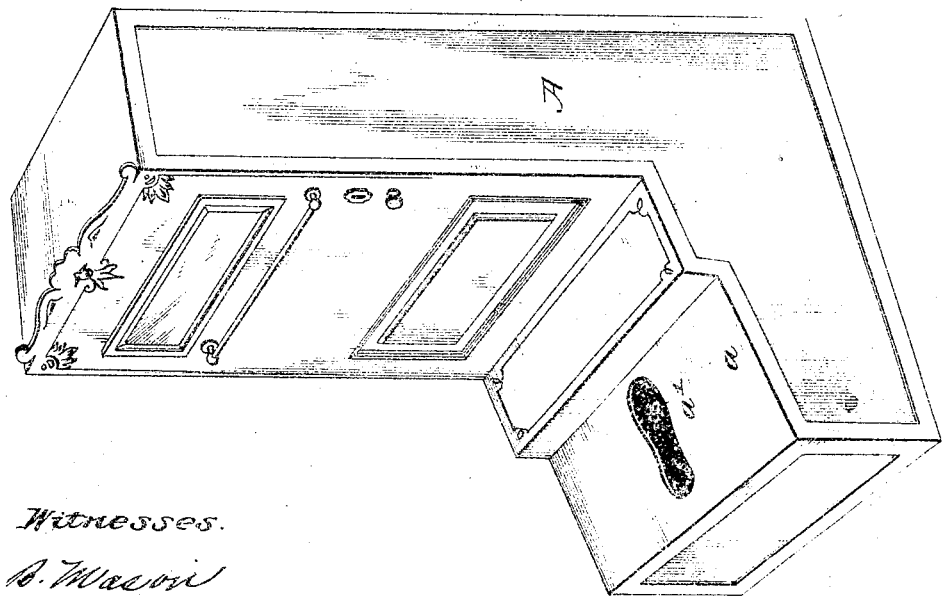

In the drawings, Figure 1 is a perspective view of the machine. Fig. 2 is a vertical section through the casing showing the mechanism in side elevation, looking to the left, the reciprocating-carriage being shown in its normal position. Fig. 3 is a similar view looking to the right, showing the reciprocating-carriage at the end of its rearward movement. Fig. 4 is a transverse vertical section taken on line 4—4, Fig. 3. Fig. 5 is a broken horizontal section on an enlarged scale taken on line 5—5, Fig. 3. Fig. 6 is a vertical longitudinal section taken on line 6—6, Fig. 5. Fig. 7 is a section similar to Fig. 2, the reciprocating-carriage being shown at the end of its forward movement. Fig. 8 is an enlarged side elevation of the inclined guide by means of which the toe-brush is elevated against the blacking-receptacle. Fig. 9 is an enlarged sectional elevation of the forward end of the belt-shifting rod and its supports. Fig. 10 is an enlarged sectional plan view of the reciprocating-carriage, and the parts carried thereon. Fig. 11 is a longitudinal section taken on line 11—11, Fig. 10. Fig. 12 is a vertical section taken on line 12—12, Fig. 10. Fig. 13 is a horizontal section taken on line 13—13, Fig. 12. Fig. 14 is an enlarged horizontal section taken on line 14—14, Fig. 3, the brushes being shown in action against a shoe. Fig. 15 is a similar view, the toe-brush being in its elevated position, and the side blacking-brushes being swung outward to avoid contact with the shoe on the return movement of the carriage. Fig. 16 is a transverse section through the reciprocating carriage taken on line 16—16, Fig. 10. Fig. 17 is a horizontal section taken on line 17—17, Fig. 16. Fig. 18 is an enlarged front elevation of the trip-rod whereby the coin is released, and the inclined co-acting rider-bar over which said trip-rod travels. Fig. 19 is a central vertical section through the side blacking feed box. Fig. 20 is a side elevation of said blacking-box showing the ratchet-arm thereof in engagement with the feed trip on the front end of the reciprocating-carriage. Fig. 21 is a section on line 21—21, Fig. 18. Fig. 22 is a top plan view of the catch for holding the toe-brush frame in its elevated position.

Referring to the drawings in detail, corresponding letters of reference refer to like parts in the several figures.

The reference letter A designates the casing which may be of any desirable shape, and constructed of any suitable material, but as herein shown has a forward extension $a$ at its lower end in which an opening $a^1$ is formed to permit the insertion of a person's foot into the casing.

B designates the foot-rest affixed to the bottom of the casing directly beneath the opening $a^1$.

C designates a supporting-frame having side guide-rods $c$, and a feed-screw $c^1$ journaled to revolve therein. Two pulleys $c^2$ are secured to the feed-screw, and a third pulley $c^3$ is held loosely on said feed-screw between the pulleys $c^2$.

The feed-screw may be revolved by any suitable source of power and any suitable transmission mechanism may be adopted to revolve said pulleys. By preference, however, I have arranged to operate the mechanism by means of an electro-motor D, from which I transmit motion to a countershaft $D^1$ by a belt $d$, and in turn transmit the motion of the countershaft to the feed-screw by two belts $d^1$, one of which is crossed to reverse the feed-screw. As is common in belt drives of this kind, the belts $d^1$ are each caused to alternately engage the loose pulley and one of the fixed pulleys on the feed-screws.

E designates the reciprocating-carriage having a depending lug $E^1$ at its rear end provided with a screw-threaded aperture $e$ in which the feed-screw $c^1$ is operatively held. The reciprocating-carriage is provided with guide-rollers $e^1$ which ride over the guide-rods $c$. Secured to the rear end of said carriage are two standards or posts F on which a vertically movable yoke-bar or frame $F^1$ is held; a gear-rack $f$ being formed on said yoke-bar midway between its ends. A journal-box $F^2$ is affixed to each of said standards to receive the journals $f^1$ of a transverse shaft $F^3$. Supported pivotally on a sleeve $F^4$ surrounding said shaft is a brush-frame G having the toe blacking-brush $G^1$ journaled therein, and secured to said frame is a curved rope-guide $g$ to which is secured a rope or wire $g^2$ that passes over a pulley $g^3$ secured to the rear wall of the casing, and to the free end of said rope or wire is suspended a weight $g^4$ serving to elevate said frame when said weight comes in contact with the pulley. Secured to the shaft of the toe-brush $G^1$ is a pulley $g^5$ around which and a pulley $g^6$ secured to the shaft $F^3$, a belt $g^7$ passes. The shaft $F^3$ is revolved by means of a belt $g^8$ passing around a pulley $g^9$ secured to said shaft, thence over idlers $g^{10}$ secured to a standard $g^{11}$ affixed to one side of the carriage, and around a suitably journaled longitudinal roll H located at the bottom of the casing along one side wall thereof. The roll H is revolved by a belt $H^1$ passing around the same and around a pulley $H^2$ secured to the countershaft $D^1$. A pinion $F^5$ is secured to the sleeve $F^4$ and meshes with the gear-rack $f$ on the yoke-bar $F^1$, thus serving to respectively elevate and lower said yoke-bar when the frame G is lowered and raised. Projecting forward from the yoke-bar $F^1$ are two sets of companion guide-rollers $F^6$ between which two transversely disposed polishing-bands I are guided; said polishing-bands serving to polish the blacking applied to the front and toe of the shoe by the toe-brush $G^1$. The polishing-bands are caused to travel in opposite directions in any suitable manner, but as illustrated, two longitudinal shafts J, $J^1$ are journaled in brackets $J^2$ arranged in sets of two on opposite sides of the reciprocating-carriage. Secured to each of said shafts is a pulley $j$, and passing around one of said pulleys, over idlers $j^1$, and around the longitudinal roll H is a belt $j^2$. A second belt $j^3$ is crossed and passed around the other pulley $j$ and the roll H. By this arrangement the shafts J, $J^1$, are caused to revolve in opposite directions. Each of said shafts has two spools K mounted thereon, one spool being loosely mounted and the other spool being affixed. Each polishing-band I passes around the fixed spool on one shaft and the loose spool on the other shaft, thereby permitting each shaft to act as a driver for one polishing-band, and merely as a support for the other polishing-band.

L designates vertical side dusting and polishing brushes and $L^1$ vertical side blacking-brushes. Supporting-bars $L^2$ are pivotally secured near their rear ends to the underside of the reciprocating-carriage by means of pivot-bolts or studs $l$ and pivotally supported on the front end of each of said bars is a rearwardly extending brush supporting-arm $L^3$. Secured to the underside of the reciprocating-carriage and bearing against the inner edges of the supporting-bars in rear of the pivotal points thereof are two springs $l^1$ tending to force the front ends of the said supporting-bars inward against depending stops $l^2$ formed on said carriage. The side dusting and polishing-brushes L are each secured to a vertical shaft $l^4$ passing through the front ends of the supporting-bars and through the brush supporting-arms, and they serve also as the pivotal connections between the said supporting-bars and the brush supporting-arms. Secured to the lower ends of each shaft $l^3$ is a pulley $l^4$ around which, idlers $l^5$ secured to the pivot bolts $l$ or otherwise, and the longitudinal roll H, belts $l^6$ are passed. The side blacking-brushes $L^1$ are each secured to a vertical shaft $l^7$ passing through the rear ends of the brush supporting-arms $L^3$ and to the lower ends of said shafts, pulleys $l^8$ are secured, around which and a pulley $l^9$ secured to each of the brush-shafts $l^3$, a belt $l^{10}$ passes. The front end of each supporting-bar $L^2$ is provided with a socket $l^{11}$ into which fits a centrally bored cylindrical boss $l^{12}$ formed on each of the brush supporting-arms. Spiral-springs $l^{13}$ surround the sockets and each spring has one end thereof engaging one side edge of the supporting-bar and its other end attached to the opposite side edge of the brush supporting-arm thus serving to swing the rear ends of said supporting-arms inward until arrested by stops $l^{14}$ formed on the reciprocating-carriage. The brush supporting-arms $L^3$ are each provided with a forward extension $L^4$ adapted when the carriage approaches the end of its forward movement to engage cam-stops $L^5$ secured to the guide-bars $c$, thereby causing the rear ends of said supporting-arms to be swung outward, by which action the blacking-brushes are carried away from the shoe. The rear ends of said brush supporting-arms are provided with cam edges $l^{25}$ and when swung outward, they engage the forward upturned ends $m$ of two stop-rods M held to yieldingly move lengthwise on the reciprocating carriage and cause said stop-rods to slide rearward until the supporting-arms have cleared the upturned ends of said rods, when the latter are caused to move forward by the action of spiral-springs $m^1$. To prevent turning of the stop-rods, each rod is offset, as at $m^2$, and the rear ends thereof are each pivotally connected to a trip $m^3$.

The trips $m^9$ are pivoted between their ends to extensions $m^4$ formed on the rear end of the reciprocating-carriage, and the free ends of said trips are adapted to engage stops $m^5$ secured to the guide-rods $c$ of the supporting-frame, thereby causing the stop-rods M to be disengaged from the brush supporting-arms and allow said arms to swing inward against the stops $l^{14}$ on the reciprocating-carriage.

Extending from one side of the brush-frame G is a rider arm N having a roller $n$ at its outer end adapted to ride over an inclined guide or way $n^1$ secured to the side wall of the casing, and serving to bring the toe-brush G carried by said frame, in contact with a blacking supply to be presently described. Said roller is also adapted to engage a stop $n^2$ on said side wall to cause the brush-frame to drop when the reciprocating-carriage is being returned to its starting point. When the carriage is traveling forward the brush-frame is lowered gradually and is guided in its movement by the roller $n$ riding down the inclined way $n^1$. During this forward movement of the carriage the weight $g^4$ is elevated until it strikes the pulley $q^3$, which occurs after the toe-brush has applied the blacking to the front of the shoe. As the carriage travels still further forward, the brush-frame G is caused to be elevated by reason of the rope or wire $q^2$ being held taut and it is held in its elevated position by a catch $n^3$ secured to an arm $n^4$ affixed to one of the standards F. A stop $m^5$ serves, with the aid of a spring $n^6$, to hold said catch in operative relation to the brush-frame. When the brush-frame G is being elevated, the polishing-bands are passing over the toe and the front of the shoe and are held with considerable pressure against the shoe by the guide-roller $F^6$; the pressure being caused by the lowering of the yoke-bar $F^1$, through the action of the pinion $F^5$ against the gear rack $f$ on said yoke-bar. The side blacking and polishing-brushes yield to accommodate the width of the shoe being polished and the springs $l^1$ and $l^{13}$ supply the required pressure.

When the carriage is being returned the weight $g^4$ takes up the slackness of the rope or wire $q^2$, and the brush-frame G is lowered at a certain point in the movement of the carriage by the roller $n$ striking the stop $n^2$ and holding the upper end of the frame against rearward movement, while the pressure thus exerted causes the catch $n^3$ to be released from the frame G and permits the latter to drop; its descent being stopped by the roller $n$ striking the inclined way $n^1$ on which it rides, said inclined way causing the brush to be gradually elevated as the carriage completes its return movement. As the brush is thus gradually elevated, it is pressed against a blacking receptacle O which supplies the brush with blacking. A blacking receptacle $O^1$ is located at one side of the casing and when the adjacent side blacking-brush is swung outward it is supplied with blacking on the return movement of the carriage.

Each blacking receptacle comprises a box P having one wall thereof perforated, and its opposite wall made removable to permit of filling the box with blacking when empty. A feed-screw $p$ passes through said removable wall and is secured with its inner end to a follower-plate $p^1$ so as to revolve without turning said plate. The blacking is placed between said follower-plate and the perforated wall of the box and is forced out through the perforations on revolving said feed-screw. A ratchet-wheel $p^2$ is secured to the feed-screw of each blacking receptacle and coöperating with each ratchet-wheel, is a ratchet-arm $p^3$ held loosely on the feed-screw and having a pawl $p^4$ pivotally held thereon. The ratchet-arm $p^3$ of each side blacking receptacle extends into the path of a trip-arm $p^5$ secured to the side of the reciprocating-carriage E, said trip-arm being pivoted between its ends and having a spring $p^6$, serving to hold the arm normally against a stop $p^7$ projecting from the carriage. On the forward movement of the carriage E, the trip-arm $p^5$ is tilted by the ratchet-arm, and on the return movement of the carriage the ratchet-arm is actuated and causes the feed-screw to revolve and force a supply of blacking out through the perforated wall of the blacking receptacle. After passing over the trip-arm and revolving the feed-screw, the ratchet-arm gravitates and bears against a stop $p^8$ formed on the blacking-box, when it is prepared to again revolve the feed-screw.

The stops $p^8$ on the blacking boxes serve to hold the ratchet-arms $p^3$ against movement when the trip-arms $p^5$ come in contact therewith on the forward movement of the carriage.

The blacking-receptacle O for supplying the toe-brush with blacking, is suitably supported by a bracket $O^2$ extending from the side wall of the casing. This receptacle is in exact duplicate of the side blacking-receptacles, except that it requires a spring $p^9$ to return the ratchet-arm $p^3$; this being due to the feed-screw being arranged vertically and the ratchet-arm $p^3$ horizontally. The ratchet-arm on the receptacle O has a downwardly extending end which lies in the path of the reciprocating-carriage, on the return movement of which latter the ratchet-arm is engaged and causes the feed-screw to revolve, thereby forcing out a quantity of blacking through the perforated wall of the blacking-receptacle to be taken up by the toe-brush as it comes in contact with the receptacle. On the forward movement of the reciprocating-carriage, the ratchet-arm is released and returned to its normal position by action of the spring $p^9$. In returning to its normal position, the pawl on the ratchet-arm rides over the ratchet, and is positioned to again revolve the ratchet and feed-screw on the return movement of the reciprocating-carriage.

R designates a shifting-rod having a belt-shifter $r$ secured to its rear end and being guided in suitable supports $r^1$. The front end of said shifting-rod is provided with two notches $r^2$ on its under side which are adapted to engage one of the supports $r^1$ and prevent unintentional movement of said rod. A flat spring $r^3$ is secured to one of said supports and bears against the shifting-rod to hold the notches thereof in engagement with the coöperating support. Collars $r^4$ are formed on or secured to said rod and bearing against opposing faces of said collars are spiral springs $r^5$ which are held loosely on said rod. A fork-arm $r^6$ is secured to the carriage E and straddles the shifting-rod; its purpose being to compress the forward spring $r^5$ when the carriage moves forward and when sufficiently compressed, cause the pressure to be imparted to the collar against which said spring bears and thereby disengage the forward notch in the shifting-bar from the support and cause the rear notch to engage said support. This causes the belt-shifter $r$ secured to said shifting-rod $R^1$ to shift the belts and reverse the movement of the carriage. The other spring $r^5$ serves the same purpose on the rearward movement of the carriage. The springs tend to quickly shift the rod when started, and also tend to prevent shifting of the belts.

Beneath the belt-shifter is a vertical plate S having an oppositely inclined upper edge which is so arranged with reference to the belt-shifter that when the latter is moved into one position, the arm $s$ thereof bears against one incline of said plate, and when said shifter is moved into its other position said arm bears against the other incline of said plate. By this means, accidental shifting of the belts is avoided, as sufficient pressure must be exerted to force the arm $s$ over the ridge formed by the meeting of the opposite inclines, in order to change the position of the belt-shifter to an extent sufficient to move the belts for a reverse movement of the feed-screw $c^1$, ordinary jars and the wearing of bearing tending to throw the feed-screw out of alinement with countershaft $D^1$ being insufficient to force the arm $s$ over said ridge.

I have provided coin-controlled mechanism for starting and stopping the motor, and it consists of a coin-chute T having two notches $t$ formed therein, and having also a stop-bar $t^1$ pivoted thereon. Said stop-bar is insulated from said chute and is provided with two contact teeth $t^2$ which enter said notches and extend into the path of the coins, but do not come in contact with the metal of the coin-chute. Electric circuit-wires $t^3$ connect the chute with the supply-wire, and the stop-lever with the motor, which latter is also connected with the supply-wire, thus forming a partial circuit which will be completed by connection of the chute with the stop-bar. A spring controlled pin $t^4$ passes through the front wall of the casing and enters the coin-chute between said notches and serves to close the coin-passage. The lower end of the stop-bar $t^1$ is curved rearwardly and has one end of a spiral-spring $t^5$ secured thereto; said spring having its other end secured to any suitable fixed point.

U designates a trip-rod having its upper end formed into a hook passing over the rear curved end of the stop-bar $t^1$ and being held out of contact therewith by a spiral-spring $u$. Said trip rod is provided at its lower end with a roller $u^1$, and consists of two pivotally connected sections arranged to be normally held in alinement by a spring $u^2$, but permits of the lower section to swing laterally on the upper section. As the reciprocating-carriage is moved rearward, the roller $u^1$ is engaged by an inclined bar $u^3$ which is secured to the upper end of one of the posts or standards F, and the trip-rod is elevated until the forward end of said inclined bar passes in rear of the same, when said rod gravitates and causes the hooked upper end thereof to strike the rear curved end of the stop-bar, which causes the upper end of the stop-bar to swing away momentarily from the coin-chute. When a coin is deposited in the coin-chute, it is stopped in its course by the upper contact tooth $t^2$, thereby completing an electric circuit and causing the motor to revolve. The carriage moves forward and backward, and at the end of its backward movement causes the trip-rod to be actuated for releasing the coin, which is next stopped in its course through the chute by the spring-controlled pin $t^4$, which will when drawn out, permit the coin to drop against the second contact tooth on the stop-bar, when an electric circuit is again established and the carriage moved forward and backward. When the carriage again reaches the end of its backward stroke the trip-rod actuates the stop-bar and releases the coin, which then drops into the coin-receptacle. It is thus provided that the two shoes can be blackened and polished on depositing a single coin into the coin-chute. When the carriage E is moved forward, the front cam-edge $u^4$ of the inclined bar $u^3$ comes in contact with the lower section of the trip-rod U and swings said section laterally out of the path of said bar, until the carriage has passed the latter when the spring $u^2$ causes the lower section to swing into its normal position.

Many changes in form, construction and arrangement of parts of this invention may be resorted to without departing from the spirit of my invention or sacrificing any of the advantages thereof.

Having thus described my invention, what I claim is,—

1. In a shoe polishing-machine, the combination with a foot-rest, of a suitable driving element, two oppositely traveling polishing bands, and means for transmitting motion from said driving element to said polishing bands.

2. In a shoe polishing-machine, the combination with the foot-rest, of a blacking-device movable toward and from a shoe supported on said foot-rest, oppositely traveling polishing bands serving to polish the shoe after the application of blacking by said blacking device, and means for operating the blacking device and the said polishing bands.

3. In a shoe polishing-machine, the combination with a suitable foot-rest, of a blacking device adapted to apply blacking to a shoe supported on said foot-rest, means for moving said blacking device away from said shoe after applying blacking thereto, a traveling polishing band serving to polish the shoe, mechanism for causing the said band to act against the shoe with increased pressure when said blacking device is moved away from the shoe, and means for operating the blacking device and said polishing band.

4. In a shoe polishing-machine, the combination with a suitable motor, of a suitably journaled revoluble feed-screw, a supporting-carriage suitably guided and having threaded connection with said feed-screw, a longitudinal driving roll, transmission mechanism connecting the said motor with said driving roll and with the feed-screw, means for reversing the feed-screw, and blacking and polishing devices carried by the supporting-carriage and being operatively connected with said driving roll.

5. In a shoe polishing-machine, the combination of a reciprocating carriage, a brush-frame pivotally supported on said carriage, a revoluble brush journaled in the outer end of said frame, a polishing device carried on said carriage in rear of said brush, a blacking supply against which said brush is normally held, means for elevating said brush frame after the blacking-brush has applied blacking to the shoe, and transmission mechanism for revolving said brush and operating the polishing device.

6. In a shoe polishing-machine, the combination with the foot-rest, of a supporting bar pivotally supported at or near its rear end to permit of moving horizontally, a spring serving to hold said bar in its normal or innermost position, a brush supporting-arm pivotally connected to the front end of the supporting-bar, a spring serving to hold the rear end of said supporting-arm inward, a blacking-brush revolubly held on the rear end of said supporting-arm, a polishing brush revolubly held on the said supporting-arm and having the axis coincident with the axis of the pivot connecting said brush supporting-arm and the supporting-bar.

7. In a shoe polishing-machine, the combination with the foot-rest, of a reciprocating-carriage, supporting-bars pivotally supported on opposite sides of said carriage so as to pass on opposite sides of the foot-rest when the said carriage is reciprocated, a brush supporting-arm lying above said supporting-bar, a polishing-brush having its shaft passing through said supporting-arm and the front end of said supporting-bar to form a pivotal connection, means for revolving said brush-shaft, a brush carried on the rear end of said supporting arm, a spring serving to hold the free ends of said supporting-bar and said supporting-arm inward and serving also to permit said bar and said arm to accommodate themselves to the size of the shoe being polished, and means for forcing the rear end of said supporting-arm outward when the reciprocating-carriage reaches the end of its forward movement.

8. In a shoe polishing-machine, the combination of a reciprocating-carriage, a transverse shaft supported on said carriage, means for revolving said shaft, a sleeve surrounding said shaft and being held against revolving therewith, a brush-frame secured to said sleeve, a brush journaled in the outer end of said frame, means for transmitting motion from said transverse shaft to said brush, a pinion secured to said sleeve, means for elevating said brush frame after the brush journaled therein has applied blacking to the shoe, a yoke-bar or frame guided for vertical movement on said carriage and having a vertically disposed gear-rack meshing with said pinion, guide-rollers extending from said yoke-bar, an endless band traveling transversely on said carriage and passing between said guide-rollers, all being so arranged that when the brush-frame is elevated the said guide-rollers force the endless band down to conform to the curvature of the front of the shoe being polished and apply additional pressure on the said band.

9. In a shoe polishing-machine, the combination with a supporting frame having longitudinal guide-rods, of a reciprocating-carriage guided on said guide-rods, supporting-bars pivoted to said carriage so as to swing horizontally thereon, a brush supporting-arm pivotally connected to each of said supporting-bars, springs tending to hold each supporting-arm in its innermost position, a revoluble brush journaled in each supporting-arm, means for causing said supporting-arms to swing outward when the reciprocating-carriage reaches the end of its forward movement, lock-rods movable lengthwise on the carriage and having their front ends bent upward to engage the free ends of said supporting-arms, trips pivoted between their ends and having pivotal connection with the rear ends of said lock-rods, and a stop secured to each guide-rod of the supporting-frame whereby said trips are actuated and the trip rod released from the supporting-arms to permit the latter to swing inward.

10. In a shoe-polishing machine, the combination with a foot-rest, of a blacking-device movable toward and from a shoe supported on said foot-rest, a polishing-band following the blacking device in action on the shoe, and means for actuating said blacking device and the polishing-band.

11. In a shoe-polishing machine, the combination with the foot-rest, of a pivoted frame, a blacking device carried by said frame, an endless band, means for actuating said band and said blacking device, a pressure device for holding said endless band with pressure against a shoe supported on the foot-rest, and means connecting the pressure device with said frame, said means acting to supply the pressure of the band against the shoe when said frame is elevated and to relieve the pressure when said frame is lowered.

12. In a shoe-polishing machine, the combination of a reciprocating carriage, a brush-frame pivotally attached to said carriage to swing in a vertical plane, a brush mounted on said brush-frame, a cord attached to said brush-frame, a pulley over which said cord passes, a weight secured to the free end of the cord and being adapted to strike said pulley at a certain point in the forward movement of the carriage to cause the brush-frame to be elevated.

13. In a shoe polishing-machine, the combination with a frame and a foot-rest, of a rectilineally movable carriage supported on said frame, means for moving said carriage backwards and forwards, blacking and polishing devices carried on said carriage one in rear of the other so as to come in contact with a shoe on the foot rest in succession on the forward movement of the carriage, means for moving the blacking devices away from the shoe on the return movement of the carriage, and means for operating said blacking and polishing devices.

14. In a shoe polishing-machine, the combination with a frame and a foot-rest, of a reciprocating-carriage supported on the frame, side-blacking and polishing devices, a toe blacking-device and a toe polishing-device all carried on said carriage, said blacking and polishing devices being arranged one in rear of the other to apply the blacking to the shoe on the forward movement of the carriage and to polish the shoe on the return movement of the carriage, means for causing the blacking-devices to move out of contact with the shoe on the return movement of the carriage, and means for operating said blacking and polishing devices.

15. In a shoe polishing-machine, the combination with a frame and a foot-rest, of a reciprocating-carriage supported on the frame, a blacking-device held pivotally on the frame and serving to apply blacking to the toe portion of a shoe supported on the foot-rest, means for causing said blacking-device to swing upward as the carriage approaches the end of its movement, a polishing-device in rear of said blacking-device coming in contact with the shoe after blacking has been applied by the blacking-device, and means for operating said blacking and polishing devices.

16. In a shoe polishing-machine, the combination with the foot-rest, of a reciprocating-carriage, yielding supporting-arms carried by said carriage and arranged to pass on opposite sides of the foot-rest, a blacking-device and a polishing-device carried on each arm and adapted to act against the sides of a shoe supported on the foot-rest, means for actuating said blacking and polishing-devices, and means for moving said blacking-devices out of contact with the shoe after having applied blacking thereto.

17. In a shoe polishing machine, the combination with a foot rest, of a reciprocating carriage, yielding traveling blacking-devices and yielding traveling polishing-devices supported on said carriage means to bring the polishing-devices into action first for dusting the shoe preparatory to applying the blacking thereto, means for moving the blacking-devices out of contact with the shoe after applying blacking, said polishing-devices acting against the shoe to polish the same after said blacking-devices are moved out of contact with the shoe, and means for actuating said blacking-devices and said polishing-devices.

18. In a shoe polishing-machine, the combination with a foot-rest, of a reciprocating supporting-carriage, a plurality of revoluble brushes carried on each side of the carriage so as to pass on opposite sides of the foot-rest, each brush having a separate axis, a driving-roll arranged parallel with the line of travel of said reciprocating-carriage, and belts connecting said revoluble brushes with the driving-roll, said belts being allowed to move lengthwise on said driving-roll to correspond with the movement of said reciprocating-carriage.

19. In a shoe polishing-machine, the combination of a reciprocating-carriage, yieldingly supported blacking-devices and yieldingly supported polishing-devices carried on opposite sides of the carriage to act against the sides of a shoe, transmission mechanism for operating said blacking and polishing devices, means for causing said blacking-devices to swing outward when said carriage reaches the end of its forward movement, locking-devices for holding said blacking devices in their outward position during the return movement of the carriage, and means for actuating said locking-devices to cause said blacking-devices to be released and allow of their moving into their normal position preparatory to applying blacking on the next forward movement of the carriage.

20. In a shoe polishing-machine, the combination with the foot-rest, of a reciprocating carriage, a pair of side brushes yieldingly supported on each side of the carriage to act against opposite sides of a shoe supported on the foot-rest, means for moving one brush of each pair out of contact with the shoe at a certain point in the operation of the machine, and means for actuating said brushes.

21. In a shoe polishing-machine, the combination with a reciprocating-carriage and a foot-rest, of polishing-devices and blacking-devices, bars pivotally fixed to said carriage, and supporting-arms pivotally attached to said bars and having the polishing-devices and blacking devices mounted thereon.

In witness whereof, I have hereunto affixed my signature in the presence of two subscribing witnesses.

ROBERT O. HAMMOND.

Witnesses:
 EMIL NEUHART,
 CHAS. F. BURKHART.